(12) United States Patent
Kang et al.

(10) Patent No.: US 11,400,669 B2
(45) Date of Patent: Aug. 2, 2022

(54) METHOD OF MANUFACTURING OPTICAL MULTIPLEXER AND OPTICAL MULTIPLEXER MANUFACTURED THEREBY

(71) Applicant: MPNICS CO., LTD., Gwangju (KR)

(72) Inventors: Sang Do Kang, Gwangju (KR); Seung Keun Oh, Gwangju (KR); Hyun Jong Kang, Gwangju (KR); Chang Hoon Ryu, Gwangju (KR)

(73) Assignee: MPNICS CO., LTD., Gwangju (KR)

( * ) Notice: Subject to any disclaimer, the term of this patent is extended or adjusted under 35 U.S.C. 154(b) by 338 days.

(21) Appl. No.: 16/484,160

(22) PCT Filed: Jul. 19, 2019

(86) PCT No.: PCT/KR2019/008926
§ 371 (c)(1),
(2) Date: Aug. 7, 2019

(87) PCT Pub. No.: WO2020/241963
PCT Pub. Date: Dec. 3, 2020

(65) Prior Publication Data
US 2021/0333476 A1    Oct. 28, 2021

(30) Foreign Application Priority Data
May 24, 2019   (KR) .................. 10-2019-0061423

(51) Int. Cl.
*B29D 11/00* (2006.01)
*C03B 19/02* (2006.01)
*G02B 6/293* (2006.01)

(52) U.S. Cl.
CPC ........ *B29D 11/00365* (2013.01); *C03B 19/02* (2013.01); *G02B 6/2938* (2013.01);
(Continued)

(58) Field of Classification Search
CPC .. G02B 6/29361; G02B 6/2938; C03B 19/02; B29D 11/00365; B29D 11/00836; B29D 11/00932
See application file for complete search history.

(56) References Cited

U.S. PATENT DOCUMENTS

2016/0025932 A1\* 1/2016 Shi .................... G02B 6/4255
385/18
2017/0010427 A1   1/2017 Shi et al.

FOREIGN PATENT DOCUMENTS

JP     2001-048554 A    2/2001
KR    10-2001-0018858 A   3/2001
(Continued)

OTHER PUBLICATIONS

International Search Report for PCT/KR2019/008926 dated Feb. 24, 2020.
(Continued)

*Primary Examiner* — Mathieu D Vargot
(74) *Attorney, Agent, or Firm* — The PL Law Group, PLLC

(57) ABSTRACT

A method of manufacturing an optical multiplexer, whereby one molded product is formed by using a mold and vertically cut in a row direction, thus efficiently manufacturing multiple optical multiplexers, with a microlens array and an optical block being integrated together. Therefore, the present invention may increase product productivity and realize a size reduction of a product.

5 Claims, 11 Drawing Sheets

(52) U.S. Cl.
CPC .... G02B 6/29361 (2013.01); *B29D 11/00836* (2013.01); *B29D 11/00932* (2013.01); *C03B 2215/46* (2013.01)

(56) References Cited

FOREIGN PATENT DOCUMENTS

| KR | 2011-0138880 | * | 12/2011 |
|---|---|---|---|
| KR | 10-1597520 B1 | | 2/2016 |
| KR | 10-1762760 B1 | | 8/2017 |
| WO | WO 2005/088622 A1 | | 9/2005 |

OTHER PUBLICATIONS

Office action dated Jun. 9, 2020 from Korean Patent Office in a counterpart Korean Patent Application No. 10-2019-0061423 (all the cited references are listed in this IDS.) (English translation is also submitted herewith.).

Office action dated Dec. 2, 2021 from China Patent Office in a counterpart China Patent Application No. 201980001332.2 (all the cited references are listed in this IDS.) (English translation is also submitted herewith.).

* cited by examiner

S100

S300

S400

METHOD OF MANUFACTURING OPTICAL MULTIPLEXER AND OPTICAL MULTIPLEXER MANUFACTURED THEREBY

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2019/008926, filed Jul. 19, 2019, which claims priority to the benefit of Korean Patent Application No. 10-2019-0061423 filed in the Korean Intellectual Property Office on May 24, 2019, the entire contents of which are incorporated herein by reference.

TECHNICAL FIELD

The present invention relates generally to a method of manufacturing an optical multiplexer. More particularly, the present invention relates to a method of manufacturing an optical multiplexer, whereby one molded product is formed by using a mold and vertically cut in a row direction, thus efficiently manufacturing multiple optical multiplexers, with a microlens array and an optical block being integrated together. Therefore, the present invention can increase product productivity and realize a size reduction of a product.

BACKGROUND ART

Generally, in order to increase the transmission capacity in optical communication, widely used is wavelength-division multiplexing (WDM) in which optical signals of different wavelengths are multiplexed for transmission over a single strand of optical fiber.

In WDM technology, a wavelength selective device such as a thin film filter is used for multiplexing or demultiplexing signals of different wavelengths.

FIG. 1 is a view showing an example of a multiplexer 10 in the related art.

Referring to FIG. 1, the multiplexer 10 in the related art includes a microlens array 11, optical filters 12 each of which selectively transmitting only a specific wavelength of a beam incident on the microlens array, an optical block 13 for reflecting and combining beams of different wavelengths λ1, λ2, λ3, and λ4 incident on the filters 12, a collimating lens 14 for receiving and focusing a combined multi-wavelength beam.

On the other hand, the multiplexer 10 shown in FIG. 1 may function as a demultiplexer. In this case, a multi-wavelength beam of different wavelengths λ1, λ2, λ3, and λ4 is incident on a first surface of the optical block 13 through the collimating lens 14, then only a specific wavelength of the incident multi-wavelength beam is transmitted by each of the filters 12 provided on a second surface of the optical block 13 and other wavelengths are reflected, and then the transmitted wavelength is focused through the microlens array 11, whereby the multi-wavelength beam is demultiplexed.

The multiplexer 10 in the related art as described above is, however, problematic in that the optical block and the microlens array are required to be manufactured as separate parts, and the optical block and the microlens array are also required to be optically aligned to form a module, resulting in poor product productivity.

Furthermore, the optical block 120 of the multiplexer 10 in the related art is required to function to combine beams of different wavelengths internally or to split a combined beam into the beams of different wavelengths in a reverse manner. Due to this, there is a limit in that a size reduction of products is no longer achieved.

Moreover, the multiplexer 10 in the related art is still problematic in that additional provision of optical components is required in order to change an optical path in a vertical direction with respect to a direction of an optical axis, resulting in an increase in unit cost of products.

SUMMARY

Accordingly, the present invention has been made keeping in mind the above problems occurring in the related art, and an objective of the present invention is to provide a method of manufacturing an optical multiplexer, whereby one molded product is formed by using mold processing and then the molded product is cut in a row direction to manufacture multiple optical multiplexers, thus increasing product productivity.

Another objective of the present invention is to provide a method of manufacturing an optical multiplexer, whereby an optical multiplexer in which a microlens array and an optical block are integrated is manufactured, and thus optical alignment between the microlens array and the optical block is unnecessary, thus greatly improving mass productivity.

Still another objective of the present invention is to provide a method of manufacturing an optical multiplexer, whereby an optical block of a minimized size is manufactured, thus drastically reducing the length of an optical path and preventing loss of an optical signal, and the optical block is provided as a size-reduced module.

Still another objective of the present invention is to provide a method of manufacturing an optical multiplexer, whereby it is possible to realize multiplexing or demultiplexing in a vertical direction with respect to an optical axis direction, without requiring provision of a separate optical component.

The objectives of the present invention are not limited to the above-mentioned objectives, and other objectives not mentioned can be clearly understood by those skilled in the art from the following description.

In order to achieve the above objectives, according to one aspect of the present invention, there is provided a method of manufacturing an optical multiplexer (MUX), the method including: preparing a mold including a plate-shaped upper mold which has multiple first aspherical depressions having an aspherical surface shape and formed in a lower surface of the upper mold so as to form multiple columnar depression arrays, and a lower mold which has a plate shape corresponding to the upper mold and has multiple block-forming grooves having a triangle shape in vertical section and formed in an upper surface of a lower mold at positions corresponding to the columnar depression arrays; placing a raw material between the upper mold and the lower mold and pressing the molds in the vertical direction, thus forming a molded product with multiple microarray lens layers and multiple optical blocks formed in upper and lower surfaces thereof, respectively; and cutting vertically the molded product in a row direction after removing the molded product from the mold, thus obtaining an optical MUX.

In a preferred embodiment, in the cutting vertically the molded product in the row direction after removing the molded product from the mold, the molded product may be cut such that the lens layers aligned in the row direction form one microarray lens layer.

In a preferred embodiment, each of the block-forming grooves may include a first surface formed at a right angle to the upper surface of the lower mold, and a second surface extending from the first surface at a predetermined angle to the first surface, such that the block-forming groove has a right triangle shape in vertical section.

In a preferred embodiment, among the block-forming grooves, a first block-forming groove, which corresponds to a column where the first surface of the block-forming groove is located at the outermost side, may further include second aspherical depressions formed in the first surface of the block-forming groove at respective positions corresponding to the first aspherical depressions, whereby aspherical lens layers are further formed on a first surface of each of the optical blocks at positions corresponding to the second aspherical depressions.

In a preferred embodiment, the method may further include after placing the raw material between the upper mold and the lower mold and pressing the molds in the vertical direction, thus forming the molded product, and before the cutting vertically the molded product, forming different filter layers on the respective second surfaces of the optical blocks that correspond to the respective second surfaces of the block-forming grooves.

According to another aspect of the present invention, there is provided an optical multiplexer (MUX) manufactured by the method according to the present invention and including: a plate-shaped base part; a microarray lens layer integrally formed on a first surface of the base part, and having multiple aspherical surface-shaped microlens layers; and multiple optical blocks integrally formed on a second surface of the base part, and formed at respective positions corresponding to the microlens layers.

In a preferred embodiment, each of the optical blocks may include a first surface forming a right angle to the base part and a second surface formed at a predetermined angle to the first surface of the optical block, such that the optical block has a right triangle shape in vertical section, and different filter layers may be formed on the respective second surfaces of the optical blocks.

In a preferred embodiment, among the optical blocks, a first optical block of which the first surface is located at the outermost side may further include an aspherical lens layer formed in the first surface thereof.

The present invention has the following excellent effects.

First, according to the method of manufacturing the optical multiplexer, one molded product with multiple columnar depression arrays and multiple block-forming grooves formed in upper and lower surfaces thereof, respectively, is formed by using the upper mold and the lower mold, and then the molded product is vertically cut in a row direction to manufacture multiple optical multiplexers. Therefore, it is possible to increase product productivity.

Furthermore, according to the method of manufacturing the optical multiplexer, an optical multiplexer in which a microlens array and an optical block are integrated is manufactured. Therefore, it is possible that optical alignment between the microlens array and the optical block is unnecessary, thus greatly improving mass productivity.

Furthermore, according to the method of manufacturing the optical multiplexer, an optical block of a minimized size is manufactured. Therefore, it is possible that loss of an optical signal is prevented by drastically reducing the length of an optical path, and the optical block is provided as a size-reduced module.

Furthermore, according to the method of manufacturing the optical multiplexer, it is possible to manufacture an optical multiplexer which is capable of realizing multiplexing or demultiplexing in a vertical direction with respect to an optical axis direction, without requiring provision of a separate optical component such as a mirror.

Furthermore, according to the method of manufacturing the optical multiplexer, an optical multiplexer is manufactured by cutting vertically a molded product in a row direction, and also a RGB combiner having three channels is manufactured, and further a reflection-type microarray lens is manufactured by cutting the molded product in a column direction. Therefore, it is possible to maximize utilization of the molded product.

BRIEF DESCRIPTION OF THE DRAWINGS

FIGS. 3a to 3d illustrate schematic views showing steps of the method of manufacturing the optical multiplexer according to the embodiment of the present invention, in which FIG. 3a is a view showing a mold preparation step, FIG. 3b is a view showing a molded product forming step, FIG. 3c is a view showing a filter layer forming step, and FIG. 3d is a view showing a molded product cutting step.

DETAILED DESCRIPTION

Figure 1:
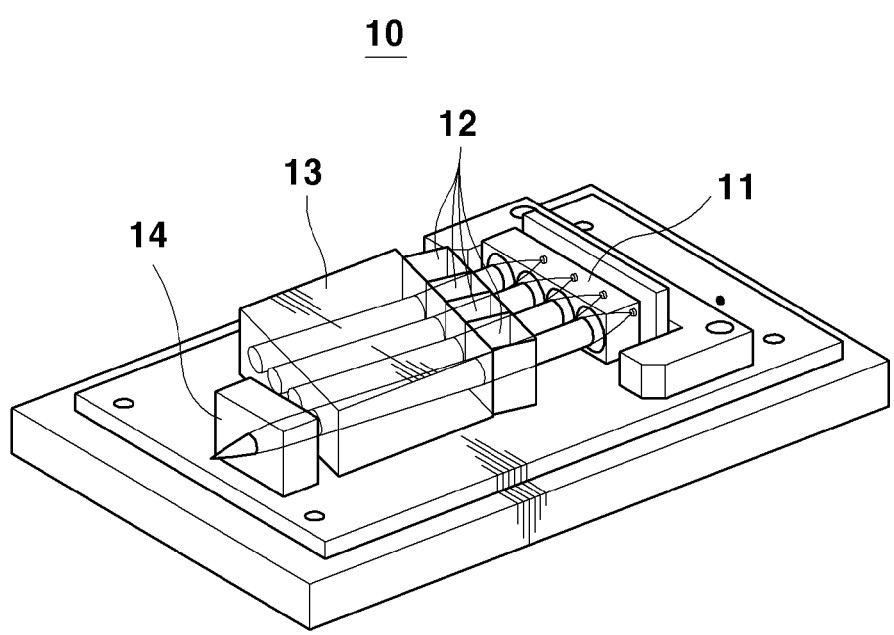
FIG. 1 is a view showing a multiplexer in the related art.

All terms including descriptive or technical terms which are used herein should be construed as having meanings that are obvious to one of ordinary skill in the art. However, some terms may be arbitrarily selected by the applicant, and in this case, the meaning of the selected terms will be described in detail in the detailed description. Thus, the terms used herein have to be defined on the basis of the meaning of the terms together with the description throughout the specification.

Hereinafter, the technical structure of the present invention will be described in detail with reference to exemplary embodiments shown in the accompanying drawings.

However, the present invention is not limited to the embodiments described herein and may be achieved in other ways. Like reference numerals are given to like components throughout the specification.

Figure 2:
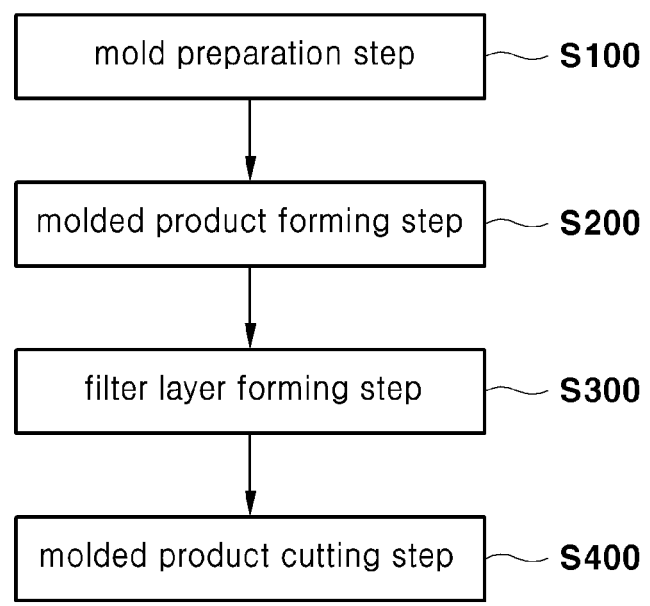
FIG. 2 is a flow chart showing a method of manufacturing an optical multiplexer according to an embodiment of the present invention.

FIG. 2 is a flow chart showing a method of manufacturing an optical multiplexer (MUX) according to an embodiment of the present invention, and FIGS. 3a to 3d illustrate schematic views sequentially showing steps of the method of manufacturing the optical MUX according to the embodiment of the present invention.

Figure 3A:
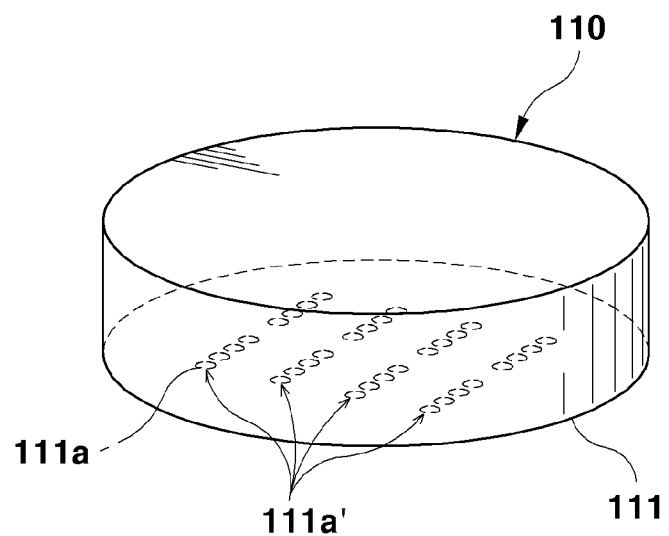
Figure 3A:
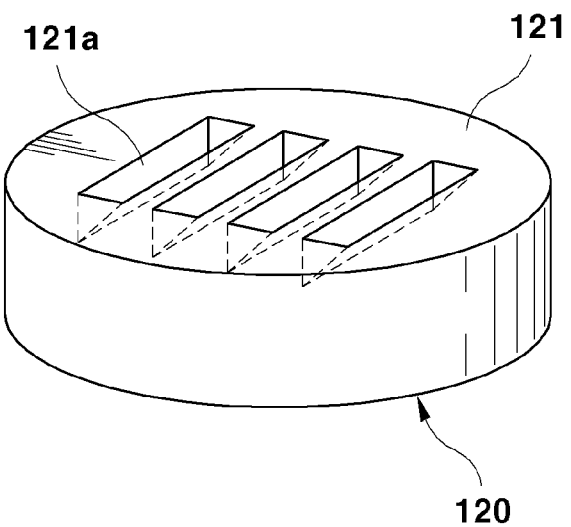

Referring to FIG. 2 and FIGS. 3a to 3d, the method of manufacturing the optical MUX according to the embodiment of the present invention is a method of forming a molded product by using mold processing and then manufacturing multiple optical MUXES by using a cutting method, in which as shown in FIG. 3a, a mold preparation step S100 of preparing a mold is performed first.

The mold includes an upper mold 110 and a lower mold 120.

Here, the upper mold 110 has a plate shape, with multiple first aspherical depressions 111a having an aspherical surface shape and being formed in a lower surface 111 of the upper mold.

Furthermore, the upper mold 110 may be made of a carbide material and a cemented carbide material.

Furthermore, the first aspherical depressions 111a are aligned in a column direction to form a columnar depression array 111a', and multiple columnar depression arrays 111a' are provided in the lower surface 111 of the upper mold 110.

While four columnar depression arrays 111a' are shown as being provided in the drawing, the present invention is not limited thereto, and the number thereof may vary easily depending on the number of wavelengths to be multiplexed or demultiplexed.

Furthermore, the lower mold 120 may be made of a carbide material and a cemented carbide material. The lower mold has a plate shape corresponding to the upper mold 110, with multiple block-forming grooves 121a being formed on an upper surface 121 of the lower mold.

Here, the block-forming grooves 121a are formed corresponding in number and position to the columnar depression arrays 111a'.

Furthermore, the block-forming grooves 121a have a triangle shape in vertical section.

Figure 4:
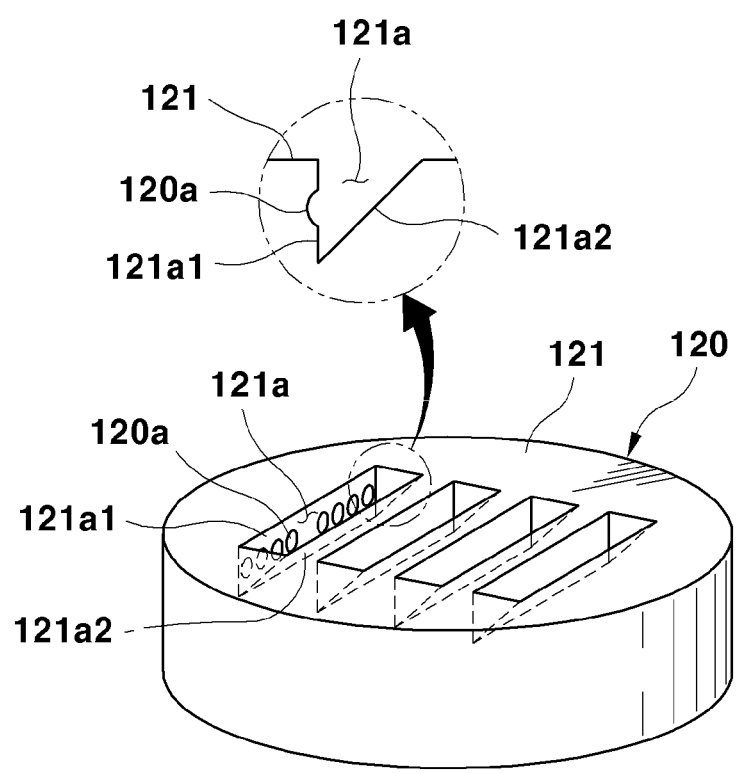
FIG. 4 is a view showing block-forming grooves of a lower mold according to an embodiment of the present invention.

In more detail, referring to FIG. 4, each of the block-forming grooves 121a includes a first surface 121a1 and a second surface 121a2.

Here, the first surface 121a1 of the block-forming groove 121a is a surface which is formed downward from the upper surface 121 of the lower mold 120 at a right angle to the upper surface 121 of the lower mold 120, and the second surface 121a2 is a surface which extends from an end of the first surface 121a1 at a predetermined angle to the first surface 121a1 and is connected to the upper surface 121 of the lower mold 120.

Due to such a structure, the block-forming groove 121a has a right triangle shape in vertical section.

Meanwhile, multiple second aspherical depressions 120a may be further formed in a first surface 121a1 of a first blocking-forming groove.

Here, the first block-forming groove denotes a block-forming groove corresponding to a column where the first surface 121a1 is located at the outermost side, among the block-forming grooves 121a.

Furthermore, the second aspherical depressions 120a having an aspherical surface shape are formed corresponding in number and position to the first aspherical depressions 111a.

This is to use the optical MUX manufactured by the method according to the present invention as a vertical-type optical MUX for performing multiplexing or demultiplexing while transitioning an optical path direction to a vertical direction, in which an optical block, a microlens array, and an aspherical lens layer is integrally formed into a single body.

Figure 3B:
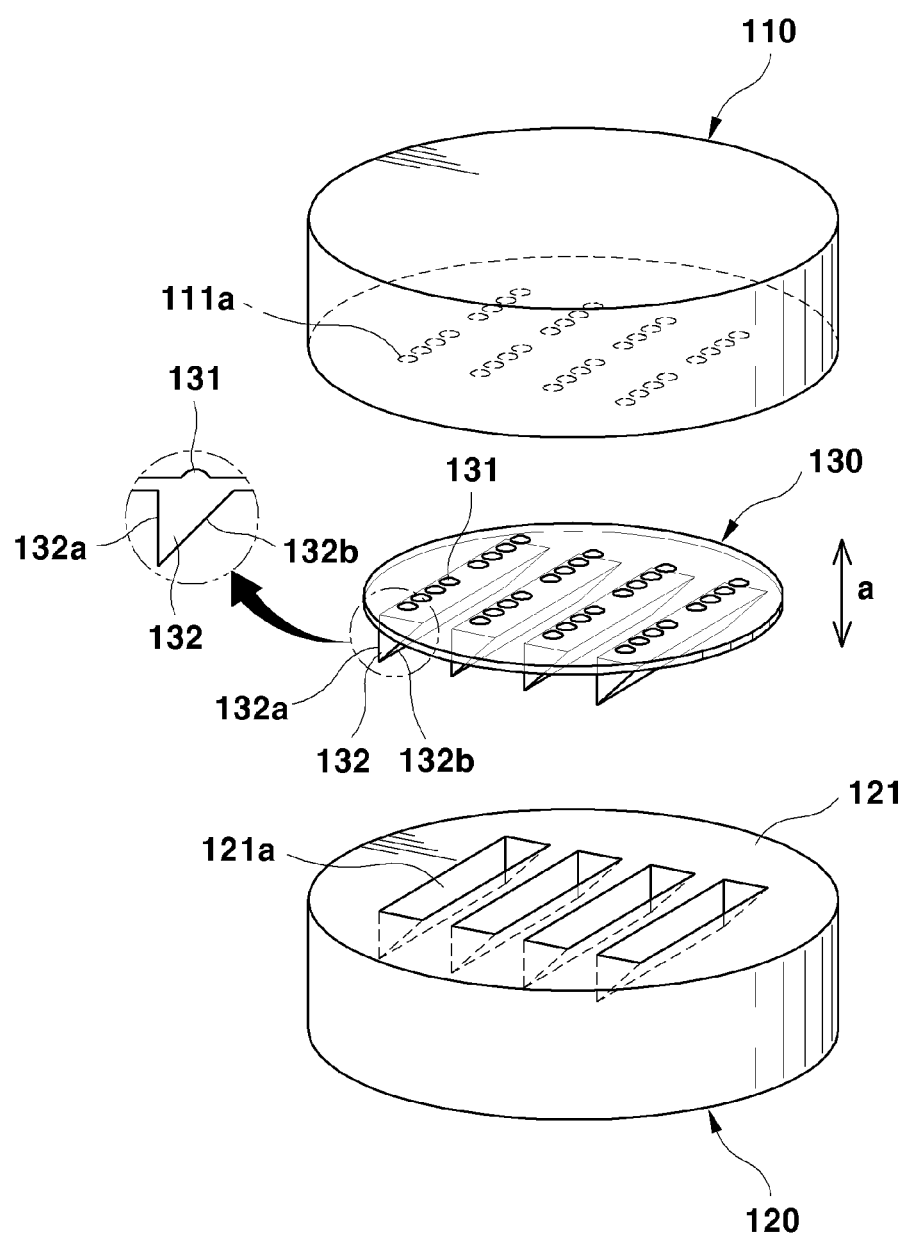

Next, as shown in FIG. 3b, the molded product forming step S200 of forming a molded product by using the prepared upper and lower molds 110 and 120 is performed.

In more detail, a raw material is placed between the prepared upper and lower molds 110 and 120, and the upper and lower molds 110 and 120 are pressed in a vertical direction a, thus forming a molded product 130.

Here, the raw material may be a glass material and is not limited as long as being a transparent material capable of efficiently transmitting light.

Furthermore, multiple microarray lens layers 131 are formed in an upper surface of the molded product 130 in a shape corresponding to the multiple columnar depression arrays 111a'.

Furthermore, multiple optical blocks 132 are formed in a lower surface of the molded product 130 in a shape corresponding to the multiple block-forming grooves 121a. Each of the optical blocks includes a first surface 132a and a second surface 132b.

Here, the first surface 132a of the optical block 132 is formed corresponding to the first surface 121a1 of each of the block-forming grooves, and the second surface 132b of the optical block 132 is formed corresponding to the second surface 121a2 of the block-forming groove.

Meanwhile, in a case where the lower mold 120 having the second aspherical depressions 120a formed in the first surface 121a1 of the first block-forming groove is used, aspherical lens layers 132aa are further integrally formed on a first surface 132a of a first optical block 132 of the molded product 130 formed through the mold forming step S200.

Here, the first optical block 132 denotes an optical block formed at a position corresponding to the first block-forming groove.

Figure 3C:
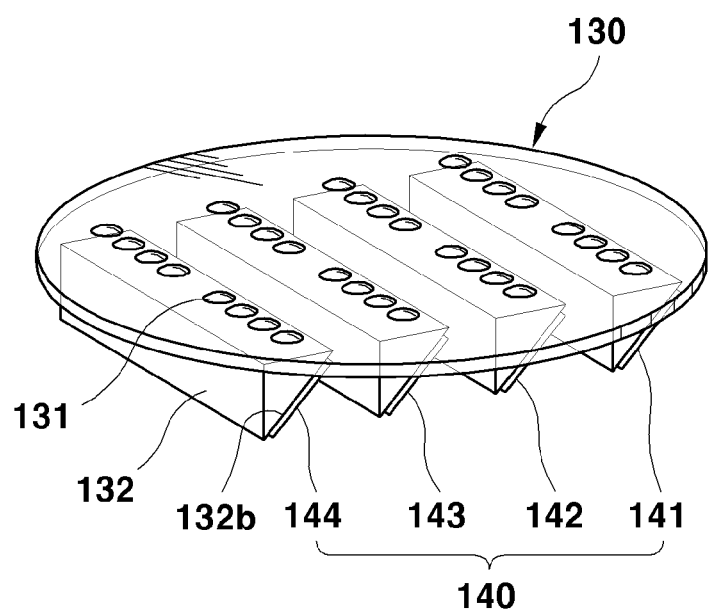
Figure 3D:
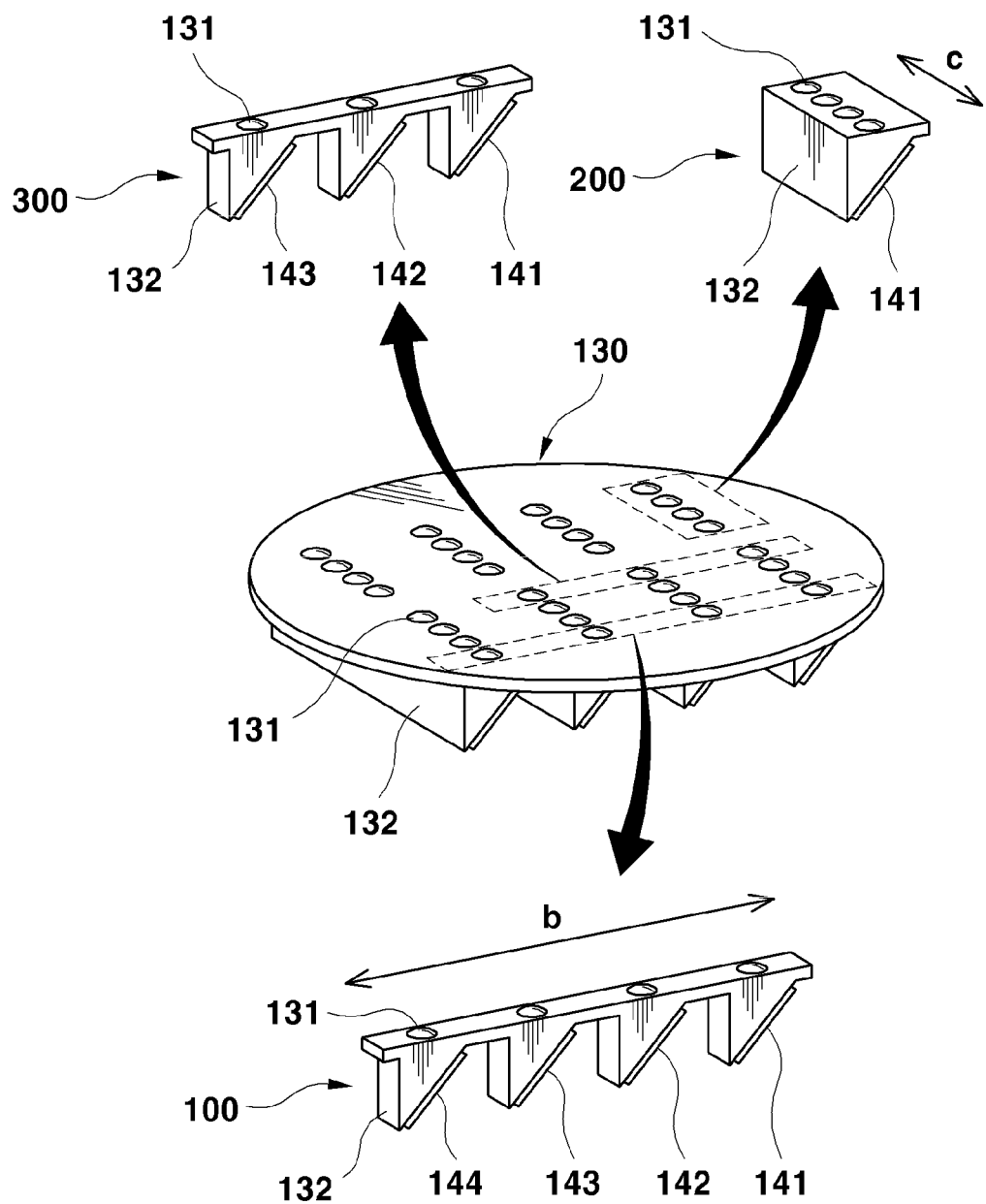

Next, as shown in FIG. 3d, the molded product cutting step S400 of cutting the molded product is performed.

Here, the molded product 130 is vertically cut in a row direction b with a cutting means, thus obtaining an optical MUX.

Here, the row direction b denotes a direction perpendicular to the columnar depression arrays 111a'.

That is, in the molded product cutting step S400, the molded product 131 is cut such that the lens layers 131 aligned in the row direction b are separated to form one microarray lens layer, thus obtaining an optical MUX 100 having an upper surface on which a microarray lens layer 131 is formed and a lower surface on which multiple optical blocks 132 are formed.

Meanwhile, the molded product 130 may be vertically cut in the same direction as the columnar depression arrays 111a', that is, in a column direction c such that the lens layers 131 aligned in the column direction are separated to form one microarray lens layer, thus obtaining a reflection-type microarray lens 200.

Furthermore, the molded product 130 may be vertically cut in the row direction b with the cutting means such that three optical blocks 132 are separated, thus obtaining an RGB combiner 300 having three channels.

That is, in the method of manufacturing the optical MUX according to the present invention, not only the optical MUX and the RGB combiner can be manufactured by cutting vertically the molded product 130 in the row direction b, but also the reflection-type microarray lens can be manufactured by cutting vertically the molded product in the column direction c. Therefore, the present invention is advantageous in maximizing utilization of the molded product 130.

Furthermore, in the method of manufacturing the optical MUX according to the present invention, the filter layer forming step S300 may be performed after the molded product forming step S200 and before the molded product cutting step S400.

Here, the molded product forming step S200 and the molded product cutting step S400 are substantially the same as those described above, and therefore, a duplicate description will be omitted.

Referring to FIG. 3c, the filter layer forming step S300 is a process for forming different filter layers 141, 142, 143, and 144 on the respective second surfaces 132b of the optical blocks 132, and this involves a typical optical filter layer forming process.

In more detail, the optical blocks 132 include a first optical block, a second optical block positioned adjacent to the first optical block, a third optical block positioned adjacent to the second optical block, and a fourth optical block positioned adjacent to the third optical block. The first, second, third, and fourth optical blocks have a fourth filter 144, a third filter 143, a second filter 142, and a first filter 141, respectively.

Meanwhile, the reason why the filter layer forming step S300 is performed between the molded product forming step S200 and the molded product cutting step S400 is that when the filter layer forming step S300 is performed after the molded product cutting step S400, a process for forming a different filter layer for each of the second surfaces 132b of the optical blocks 132 of obtained multiple optical MUXES is required, but when the filter layer forming step S300 is performed between the molded product forming step S200 and the molded product cutting step S400, an optical MUX having filter layers is obtained through a cutting process, with the filter layers being formed on the second surfaces of the optical blocks. This makes it possible to drastically reduce the number of processes of the filter layer forming step S300, resulting in an increase in product productivity.

The present invention further provides an optical MUX manufactured by the method according to the present invention.

Figure 5:
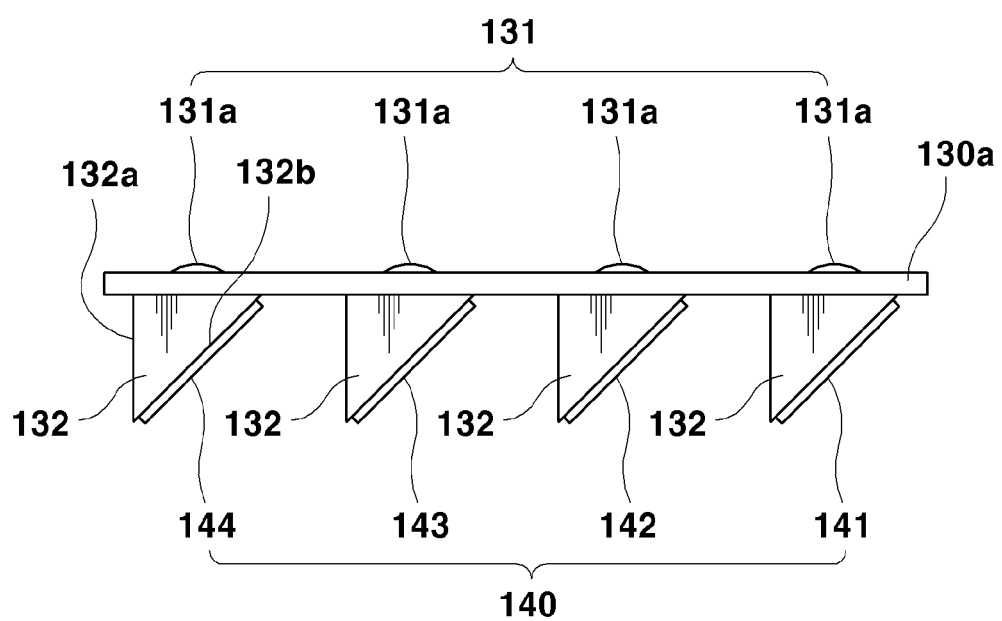
FIG. 5 is a view showing an optical multiplexer manufactured by the method of manufacturing the optical multiplexer according to an embodiment of the present invention.

FIG. 5 is a view showing a horizontal-type optical MUX according to the present invention.

Referring to FIG. 5, the horizontal-type optical MUX according to the present invention includes a base part 130a, a microarray lens layer 131, and an optical block 132.

The base part 130a is made of a transparent material and is provided in a plate shape.

The microarray lens layer 131 is integrally formed on a first surface of the base part 130a and has multiple aspherical surface-shaped microlens layers 131a.

The optical block 132 integrally extends from a second surface of the base part 130a, and multiple optical blocks are provided at respective positions corresponding to the microlens layers 131a.

Furthermore, each of the optical blocks 132 includes a first surface forming a right angle to the base part 130a and a second surface formed at a predetermined angle to the first surface of the optical block such that the optical block has a right triangle shape in vertical section.

Here, different filter layers are formed on the respective second surfaces of the optical blocks 132 to selectively transmit and reflect beams of different wavelengths.

For example, the optical blocks 132 include a first optical block, a second optical block positioned adjacent to the first optical block, a third optical block positioned adjacent to the second optical block, and a fourth optical block positioned adjacent to the third optical block. The first, second, third, and fourth optical blocks has a fourth filter 144, a third filter 143, a second filter 142, and a first filter 141, respectively.

Figure 6:
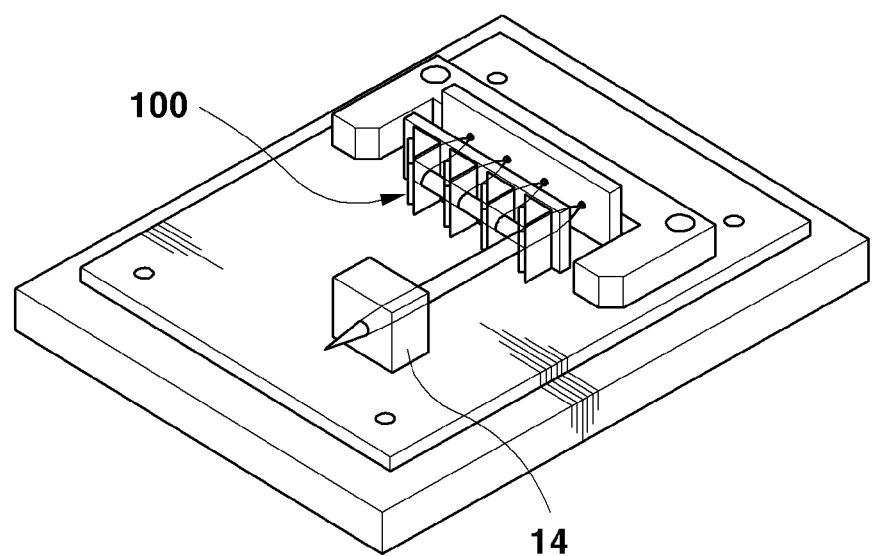
FIG. 6 is a view showing multiplexing/demultiplexing operations of the optical multiplexer of FIG. 5.
Figure 6:
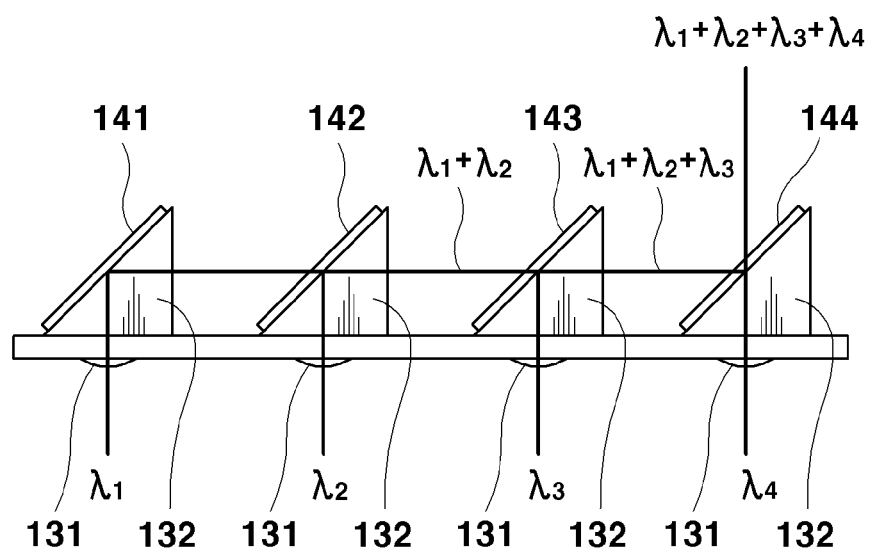

Hereinafter, the principle of multiplexing/demultiplexing operations of the horizontal-type optical MUX will be described in more detail with reference to FIG. 6.

First, a beam of a first wavelength $\lambda 1$, a beam of a second wavelength $\lambda 2$, a beam of a third wavelength $\lambda 3$, and a beam of a fourth wavelength $\lambda 4$ pass through the microarray lens layer 131 and are converted into parallel beams to be incident on the respective optical blocks 132.

The beam of the first wavelength $\lambda 1$ is reflected by the first filter 141, transmitted through the second filter 142, and multiplexed with the beam of the second wavelength $\lambda 2$ reflected by the second filter 142.

Then, the multiplexed beams of the first wavelength $\lambda 1$ and second wavelength $\lambda 2$ are transmitted through the third filter 142 and multiplexed with the beam of the third wavelength $\lambda 3$ reflected by the third filter 143.

Then, the multiplexed beams of the first wavelength $\lambda 1$, second wavelength $\lambda 2$, and third wavelength $\lambda 3$ are reflected by the fourth filter 144 and multiplexed with the beam of the fourth wavelength $\lambda 4$ transmitted through the fourth filter 144.

On the other hand, the horizontal-type optical MUX may function as a demultiplexer (DEMUX), and in this case, the DMUX performs the above-described process of multiplexing in a reverse direction.

Figure 7:
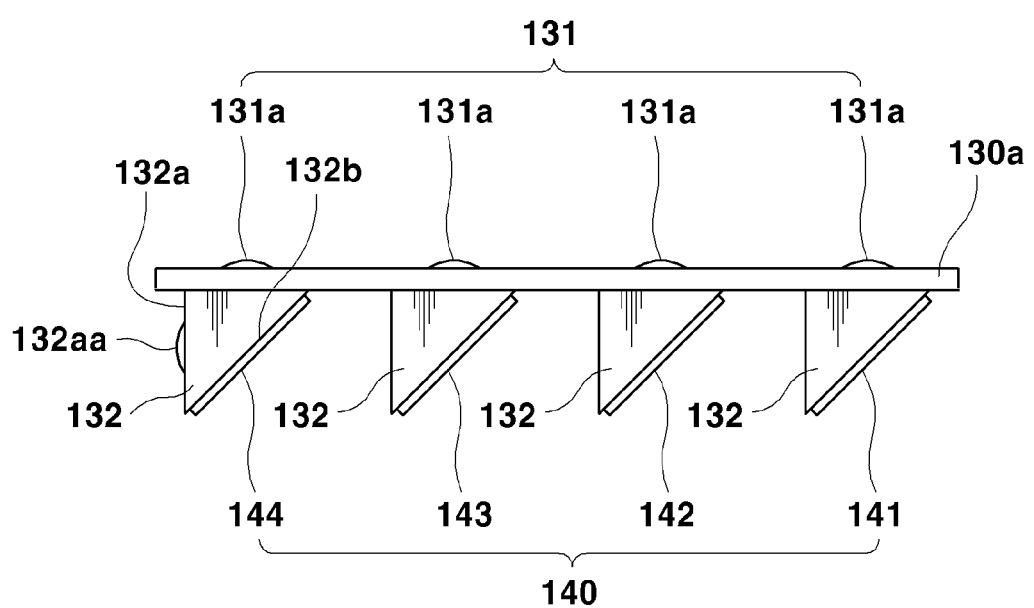
FIG. 7 is a view showing an optical multiplexer manufactured by the method of manufacturing the optical multiplexer according to another embodiment of the present invention.

FIG. 7 is a view showing a vertical-type optical MUX according to the present invention.

Referring to FIG. 7, the vertical-type optical MUX according to the present invention has the substantially same configuration as the base part 130a, the microarray lens layer 131, and the optical blocks 132 of the horizontal-type optical MUX and further includes an aspheric lens layers 132aa for converting an incident beam into a parallel beam or focusing the parallel beam.

Here, the aspherical lens layer 132aa is formed by each of multiple second aspherical depressions 120a formed in a first surface 121a1 of a first block-forming groove 121a and is integrally formed on a first surface 132a of a first optical block.

Furthermore, while the horizontal-type optical MUX according to the present invention has an optical path for multiplexing/demultiplexing in a direction parallel to an optical axis direction, the vertical-type optical MUX according to the present invention has an optical path for multiplexing/demultiplexing in a vertical direction with respect to an optical axis direction.

Figure 8:
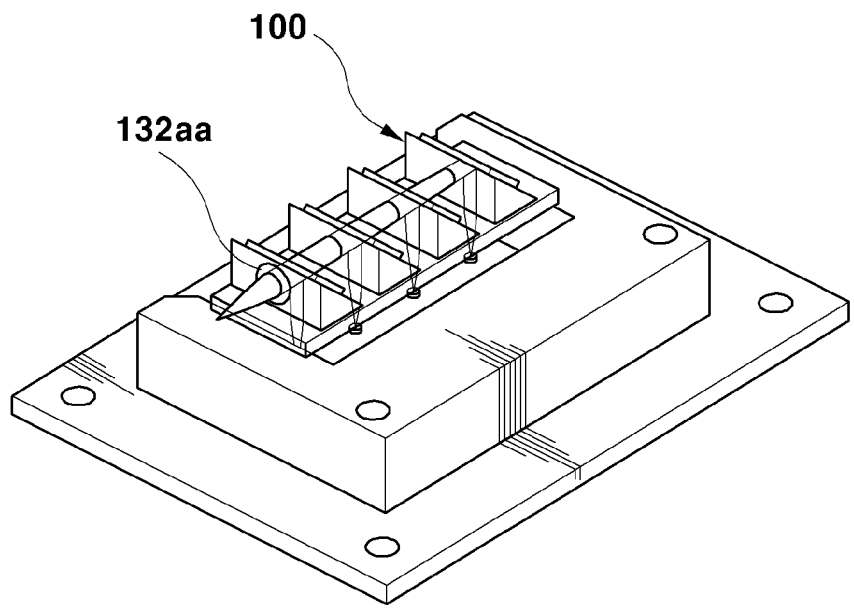
FIG. 8 is a view showing multiplexing/demultiplexing operations of the optical multiplexer of FIG. 7.
Figure 8:
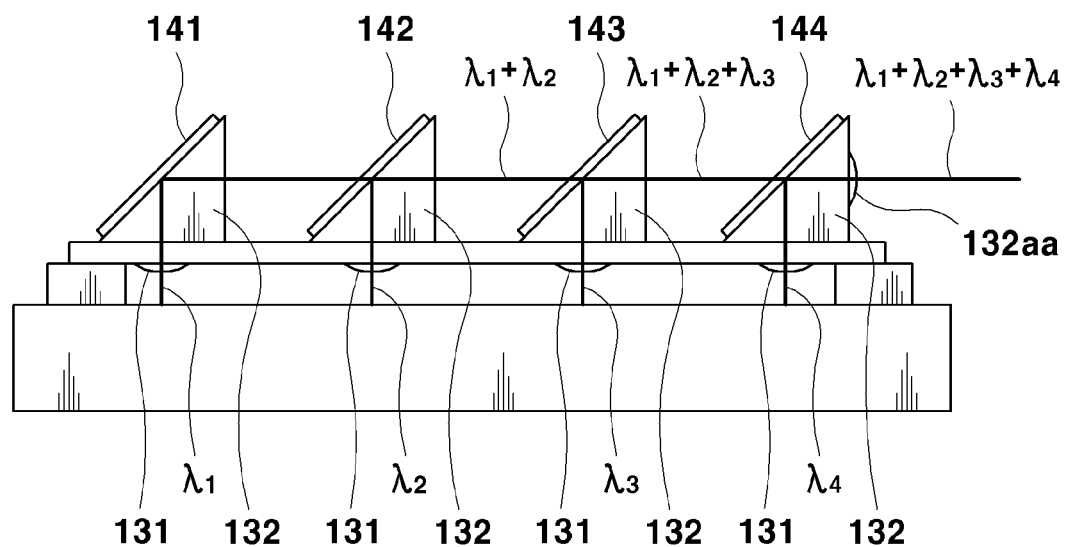

Hereinafter, the principle of multiplexing/demultiplexing operations of the vertical-type optical MUX will be described in more detail with reference to FIG. 8.

First, a beam of a first wavelength $\lambda 1$, a beam of a second wavelength $\lambda 2$, a beam of a third wavelength $\lambda 3$, and a beam of a fourth wavelength $\lambda 4$ pass through the microarray lens layer 131 and are converted into parallel beams to be incident on the optical blocks 132.

The beam of the first wavelength $\lambda 1$ is reflected by the first filter 141, transmitted through the second filter 142, and multiplexed with the beam of the second wavelength $\lambda 2$ reflected by the second filter 142.

Then, the multiplexed beams of the first wavelength $\lambda 1$ and second wavelength $\lambda 2$ are transmitted through the third filter 142 and multiplexed with the beam of the third wavelength $\lambda 3$ reflected by the third filter 143.

Then, the multiplexed beams of the first wavelength $\lambda 1$, second wavelength $\lambda 2$, and third wavelength $\lambda 3$ are reflected by the fourth filter 144 and multiplexed with the beam of the fourth wavelength $\lambda 4$ reflected by the fourth filter 144. The multiplexed beams of the first wavelength $\lambda 1$, second wavelength $\lambda 2$, third wavelength $\lambda 3$, and fourth wavelength $\lambda 4$ are focused through the aspherical lens layer 132aa onto an optical fiber.

Therefore, it is possible for the vertical-type optical MUX according to the present invention to be provided in a form in which optical alignment with a separate collimating lens is unnecessary due to the fact that the aspherical lens layer 132aa is formed integrally on the optical block 132. In addition, it is possible to realize multiplexing or demultiplexing in a vertical direction with respect to an optical axis direction, without requiring provision of a separate optical component such as a mirror.

Furthermore, the vertical-type optical MUX may function as a DEMUX, and in this case, the DMUX performs the above-described process of multiplexing in a reverse direction.

Meanwhile, filters applied to the horizontal-type optical MUX according to the present invention and filters applied to the vertical-type optical MUX according to the present invention are configured such that the first filter 141, the second filter 142, and the third filter 143 are used in common. However, there is a difference in that while the fourth filter 144 is provided to function to transmit the beam of the fourth wavelength $\lambda 4$ and reflect the remaining beams of the wavelengths $\lambda 1+\lambda 2+\lambda 3$ when used in the horizontal-type optical MUX, the fourth filter 144 is provided to function to reflect the beam of the fourth wavelength $\lambda 4$ and transmit the remaining beams of the wavelengths $\lambda 1+\lambda 2+\lambda 3$ when used in the vertical-type optical MUX.

As described above, in the method of manufacturing the optical MUX and the optical MUX manufactured thereby according to the present invention, one molded product with the multiple columnar depression arrays and the multiple block-forming grooves formed in the upper and lower surfaces thereof, respectively, is formed by using the upper mold and the lower mold, and then the molded product is vertically cut in the row direction to manufacture multiple optical MUXES. Therefore, the present invention is advantageous in increasing product productivity.

Furthermore, in the method of manufacturing the optical MUX and the optical MUX manufactured thereby according to the present invention, an optical MUX in which a microlens array and an optical block are integrated is provided. Therefore, the present invention is advantageous in that optical alignment between the microlens array and the optical block is unnecessary, thus greatly improving mass productivity.

At the same time, in the method of manufacturing the optical MUX and the optical MUX manufactured thereby according to the present invention, an optical block of a minimized size is provided. Therefore, the present invention is advantageous in that loss of an optical signal is prevented by drastically reducing the length of an optical path compared with a MUX in the related art, and the optical block is provided as a size-reduced module.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The optical MUX and optical DEMUX provided by the present invention can be used as various optical modules such as an RGB combiner, a transmitter optical sub-assembly (TOSA), a receiver optical sub-assembly (ROSA), and the like.

The invention claimed is:

1. A method of manufacturing an optical multiplexer (MUX), the method comprising:
   preparing a mold including a plate-shaped upper mold which has multiple first aspherical depressions having an aspherical surface shape and formed in a lower surface of the upper mold so as to form multiple columnar depression arrays, and a lower mold which has a plate shape corresponding to the upper mold and has multiple block-forming grooves having a triangle shape in vertical section and formed in an upper surface of a lower mold at positions corresponding to the columnar depression arrays;
   placing a raw material between the upper mold and the lower mold and pressing the upper and lower molds in the vertical direction, thus forming a molded product with multiple microarray lens layers in upper surfaces thereof and multiple optical blocks formed in lower surfaces thereof;
   removing the molded product from the mold; and
   cutting vertically the molded product in the row direction and column direction to manufacture an optical multiplexer and microlens arrays together from the molded product,
   wherein the optical multiplexer is obtained when the molded product is cut in the row direction; and
   the microlens array is obtained when the molded product is cut in the column direction.

2. The method of claim 1, wherein in the cutting vertically the molded product in the row direction after removing the molded product from the mold, the molded product is cut such that lens layers aligned in the row direction form one microarray lens layer.

3. The method of claim 1, wherein each of the block-forming grooves includes a first surface formed at a right angle to the upper surface of the lower mold, and a second surface extending from the first surface at a predetermined angle to the first surface, such that the block-forming groove has a right triangle shape in vertical section.

4. The method of claim 3, wherein among the block-forming grooves, a first block-forming groove, which corresponds to a column where the first surface of the block-forming groove is located at the outermost side, further includes second aspherical depressions formed in the first surface of the block-forming groove at respective positions corresponding to the first aspherical depressions, whereby aspherical lens layers are further formed on a first surface of each of the optical blocks at positions corresponding to the second aspherical depressions.

5. The method of claim 3, further comprising: after placing the raw material between the upper mold and the lower mold and pressing the molds in the vertical direction, thus forming the molded product, and before the cutting vertically the molded product,
   forming different filter layers on the respective second surfaces of the optical blocks that correspond to the respective second surfaces of the block-forming grooves.

* * * * *